United States Patent [19]

Brimaud

[11] 4,222,466
[45] Sep. 16, 1980

[54] BRAKE HAVING AN ANNULAR CYLINDRICAL BRAKING MEMBER AND A PIVOTALLY AND SLIDABLY MOUNTED CALIPER MEMBER

[75] Inventor: Gilbert J. Brimaud, Paris, France

[73] Assignee: Societe Anonyme Francaise du Ferodo, Paris, France

[21] Appl. No.: 906,601

[22] Filed: May 16, 1978

[30] Foreign Application Priority Data

May 17, 1977 [FR] France ................................ 77 15043

[51] Int. Cl.² ............................................. F16D 53/00
[52] U.S. Cl. ..................................... 188/76; 188/73.3; 192/73; 277/30; 277/212 FB; 277/235 R; 403/134; 403/288
[58] Field of Search ...................... 188/76, 71.1, 73.3; 277/212 FB, 235, 30; 403/134, 288; 192/73

[56] References Cited
U.S. PATENT DOCUMENTS

| | | | |
|---|---|---|---|
| Re. 29,582 | 3/1978 | Brown ................................. | 188/73.3 |
| 1,967,842 | 7/1934 | Raviola et al. ..................... | 277/30 X |
| 3,166,159 | 1/1965 | Burnett ............................... | 188/73.3 |
| 3,182,753 | 5/1965 | Gancel ................................. | 188/73.3 |
| 3,262,706 | 7/1966 | Hassan ................................. | 403/134 X |
| 3,645,546 | 2/1972 | Kaufman et al. ................... | 277/30 X |
| 3,853,207 | 12/1974 | Rist ..................................... | 188/76 |
| 3,933,227 | 1/1976 | Gennes .............................. | 188/73.3 X |

*Primary Examiner*—George E. A. Halvosa
*Attorney, Agent, or Firm*—Charles E. Brown

[57] ABSTRACT

A brake is disclosed comprising an annular cylindrical braking member with brake shoes respectively on the inside and outside of the braking member which are straddled by a C-shaped caliper member. The caliper member is pivotally and slidably mounted by a composite mounting assembly comprised of a pivot pin and a tubular bracing member received snugly thereon. The pivot pin acts in tension between opposed leg portions of fixed support while the bracing member acts in compression. A sealing pad or cap is disposed at each of the ends of the passageway in the caliper member through which the mounting assembly extends for providing fluid tightness thereat.

16 Claims, 9 Drawing Figures

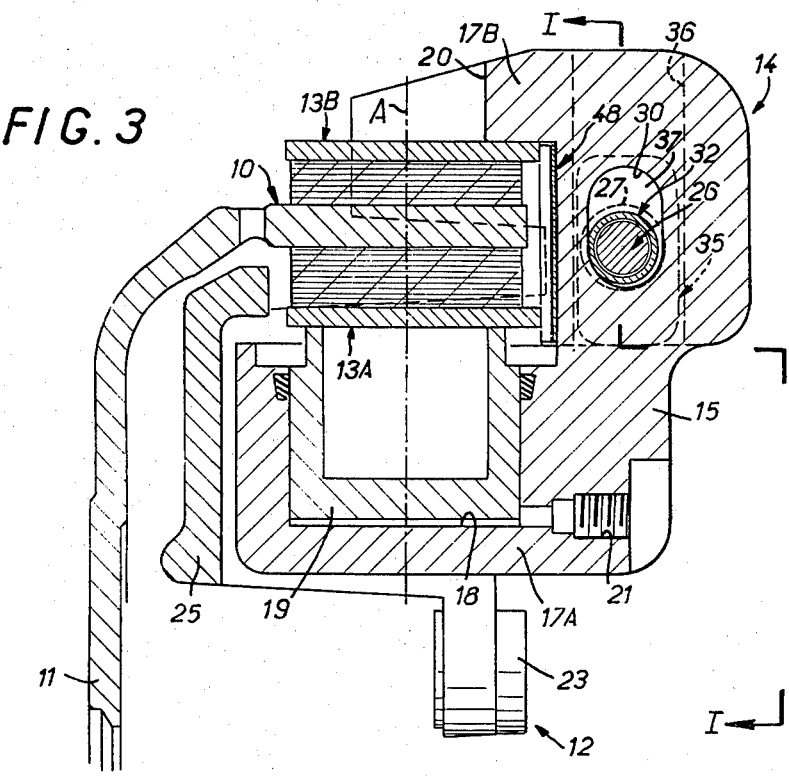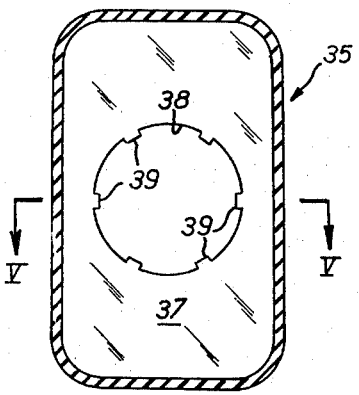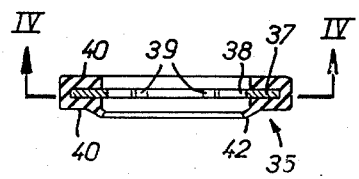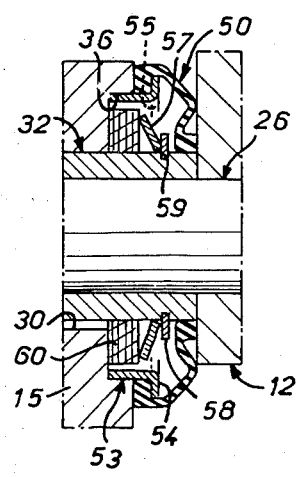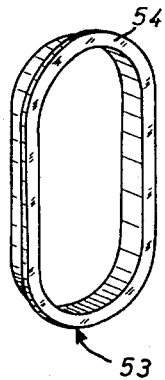

BRAKE HAVING AN ANNULAR CYLINDRICAL BRAKING MEMBER AND A PIVOTALLY AND SLIDABLY MOUNTED CALIPER MEMBER

BACKGROUND OF THE INVENTION

The present invention relates to brakes for motor vehicles, and more particularly to such brakes having a caliper member straddling an annular cylindrical braking member and mounted for pivotal and sliding movement on a fixed support.

U.S. Pat. No. 3,853,207 assigned to the assignees of the present application describes a brake for a motor vehicle of the type comprising a fixed support, an annular generally cylindrical rotary braking member, brake shoes disposed respectively inside and outside the braking member, a C-shaped caliper member which is in radial engagement with the brake shoes and the braking member, and control means for urging the first brake shoe into engagement with the braking member and at the same time against the other brake shoe to grip the braking member therebetween; the caliper member is slidably and pivotally mounted on the fixed support by means of a pivot pin which extends between two leg portions of the fixed support and traverses the caliper member.

Such sliding and pivotal mounting of the caliper member advantageously permits the caliper member to accommodate for possible conical deformations of the cylindrical braking member.

In the embodiment described in this patent, the pivot pin mounting the caliper member passes through a passageway therein substantially free of play. The passageway has a transverse cross section which, overall, is complementary to that of the pivot pin but, on the contrary, for the desired sliding movement, is received in generally radially elongated slots in the leg portions of the fixed support.

One of the problems to be overcome with such a brake design is to enable the leading leg portion of the fixed support relative to the direction of rotation of the braking member to participate in bearing the braking force. Indeed, since the brake shoes are usually bounded by the leg portions, during braking, owing to the tendency to be subjected to circumferential displacement due to them being applied against the braking member, they abut circumferentially against the lagging leg portion of the fixed support only.

In order that the lagging leg portion may partake in absorbing the braking force it has already been contemplated to fasten the leading and lagging leg portions of the fixed support together by a connecting bar. But in such known arrangements the connecting bar invariably increases the radial and/or axial dimensions of the brake which at least for certain uses may make it difficult to accommodate such a brake.

SUMMARY OF THE INVENTION

A general object of the present invention is the provision of an arrangement providing axial securement of the leading and lagging leg portions to each other without substantial increasing the overall dimensions thereof.

According to the invention there is provided a brake of the type briefly described above characterized by a tubular bracing member which is sleeved on the pivot pin and is in contact with a respective leg portion of the fixed support at each of its ends.

Concurrently tightening means which may be formed by the pivot pin itself may be fixed to the leg portions of the fixed support by threaded engagement, tying the leg portions to each other so that the tubular bracing member is under axial compression. In other words, tubular bracing member according to the invention forms an axial strut against the clamping force the pivot pin develops on the leg portions of the fixed support whereby the pivot pin and the tubular bracing member form a substantially integral mounting assembly circumferentially tying the leg portions together at a distance from their bases.

Further, since the tubular bracing member only sheathes or sleeves the outer surface of the pivot pin it does not substantially increase the dimensions of the caliper member nor those of the brake.

The present invention, its features and advantages will be brought out in the following description, given by way of example with reference to the accompanying disgrammatic drawings.

BRIEF DESCRIPTION OF THE DRAWINGS

FIG. 3 is an axial cross section taken along line III—III in FIG. 1;

FIG. 4 is a cross-sectional view, on a larger scale, of a sealing pad of the brake, taken along line IV—IV in FIG. 5;

FIG. 5 is a transverse cross sectional view of the sealing pad, taken along line V—V in FIG. 4;

FIG. 8 shows an enlarged detail of the inset VIII marked in FIG. 7; and

FIG. 9 is a perspective view of a frame member for a sealing cap employed in the modified embodiment of FIGS. 6-8.

DETAILED DESCRIPTION OF THE PREFERRED EMBODIMENTS

Figure 1:
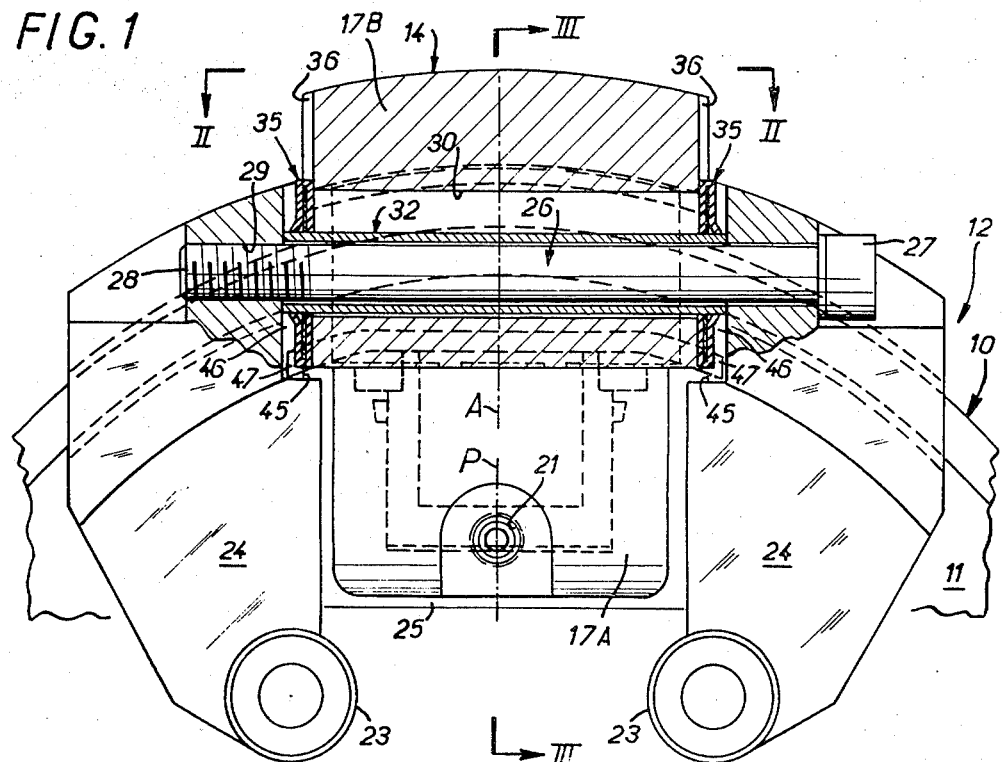
FIG. 1 is an elevational view, partly in section, of a brake embodying the present invention, taken generally along broken line I—I in FIG. 3.

In the drawings there is seen a brake having rotary braking member 10 of generally axially elongated annular cylindrical configuration. The braking member 10 is carried by a flange by which it may be secured to a shaft (not shown) to be braked, for example, for braking a wheel of a motor vehicle.

Such a brake further comprises a fixed support, two brake shoes 13A, 13B disposed respectively on the radially inner and outer surfaces of the braking member 10, and a caliper member 14 forming transfer member adapted to act on the brake shoes 13A, 13B to grip the braking member 10 therebetween, along a generally radial direction relative to the cylindrical braking member, hereinafter referred to as the gripping axis, through the central area of each of the brake shoes. The gripping axis A is represented by dash-dotted lines in FIGS. 1 and 2, and schematically by a cross in FIG. 2.

The caliper member 14 is of generally C-shape and extends radially, straddling the braking member 10 and the brake shoes 13A, 13B. The caliper member 14 comprises at the respective ends of a central portion 15 first and second arms 17A, 17B radially connected together.

The first arm 17A is generally hollow with a blind bore 18 forming a cylinder for an operating piston 19 by which it acts against brake shoe 13A; and the second arm 17B, which is slotted at 20 in the illustrated embodiment, is adapted to act against the other brake shoe 13B. At the rear of piston 19, cylinder 18 communicates through threaded passageway 21 by which it may be coupled to a source of pressurized fluid (not shown).

In the illustrated embodiment the fixed support 12 possesses an axial plane of symmetry P passing through the gripping axis A. The plane P of symmetry is represented by a dash-dotted line, in FIGS. 1 and 2.

Fixed support 12 comprises two securing lugs 23 disposed symmetrically on respectively sides of the plane P of symmetry and extending substantially parallel to flange 11 which lugs are adapted to permit the fixed support to be secured to some supporting member (not shown). The fixed support 12 also comprises two spaced apart leg portions 24 received over the braking member 10.

Within the confines of cylindrical braking member 10, the leg portions 24 are circumferentially tied to each other by connecting bar 25 which is hanger-shaped and surrounds arm 17A of the caliper member 14.

Substantially in line with the free edge of the braking member 10, a pin 26 extends between leg portions 24 of the fixed support, substantially perpendicular to the axial plane P of symmetry for pivotally and slidably mounting the caliper member 14.

According to the invention the pin 26 is rigidly fixed to the leg portions 24. In the illustrated embodiment the pin 26 comprises a threaded tie bar or bolt having a head 27 which bears against one of the leg portions 24 after passing through the same with play; the other end of the tie bar is in threaded engagement with a tapped hole 29 in the other leg portion 24.

In conjunction therewith, pin 26 extends through the caliper member transversely via slot 30 which has a generally radially elongated oblong section, parallel to the gripping axis A.

According to the invention, pin 26 is sheathed by a tubular bracing member 32 between leg portions 24 of the fixed support, and at each of its ends the tubular bracing member 32 is in contact with a respective leg portion 24 of fixed support 12.

In practice, since pin 26 formed as a threaded tie bar and thus comprises tightening means tying the leg portions 24 to each other, the tubular bracing member 32 sheathing the pin is axially in compression. In other words, firmly bearing at its ends against opposed faces of leg portions 24, it buttresses the tightening or clamping force applied by the pin against leg portions 24. Pin 26 and tubular bracing member 32 which sheathes it, form a substantially mounting assembly with each other. Obviously slot 30 in caliper member 14 is sufficiently dimensioned so that the assembly may traverse caliper member 14 with play. To provide suitable fluidtightness around the slot 30 sealing means are disposed at each of its ends. In the embodiment of FIGS. 1–5 the sealing means comprise sealing pads 35.

A such sealing pad 35, which is shown on its own in FIGS. 4 and 5, is sealingly engaged on the composite mounting assembly for the caliper member 14 which as described above comprises pin 26 and tubular bracing member 32 sheathing the same. The sealing pad is at the same time in sliding engagement in groove 36 formed in the corresponding lateral surface of the caliper member 14, the groove 36 being, overall, radially elongated, parallel to gripping axis A, as slot 30 in caliper member 14, with its flanks bounding the corresponding end of the slot.

In the illustrated embodiment the sealing pad 35 has a rigid web 37 which is a plate having a circular opening 38 in its central region and a plurality of generally radial teeth 39 alternating with notches along the inner contour of its opening 38. The teeth permit the relative anchoring of the sealing ring 35 on the tubular bracing member 32 on which it is received.

Plate 37 which forms the rigid web of the sealing pad 35 is covered on at least one face and in practice both faces by a coating 40 of yieldable material. In practice the coatings 40 are integrally formed with each other from one side of the plate to the other, with the plate embedded therein and the outer peripheral adge of the plate covered.

Finally, at least on one of the sides of plate 37 the coating 40 has a deformable lip 42 which is generally frustoconical in shape and extends circularly around the central opening 38 in the plate.

The sought-after fluidtightness for each sealing pad 35 results from the sealing pad fitting laterally in the corresponding groove 36 in the caliper member 14 and its dimension parallel to the gripping axis A being sufficient to cover, in all circumstances, the slot 30 in the caliper 14 member irrespective of the radial position thereof with respect to the composite mounting assembly formed by the pin 26 and the tubular bracing member and on the other hand lip 42 which fits elastically in engagement with the tubular bracing member 32.

The opposed faces 45 of the leg portions 24 are parallel to the axial plane P of symmetry and insure the radial guiding of the caliper member 14.

The surfaces of the leg portions 24 against which tubular bracing member 32 bear are recessed relative to the faces 45 so that the fixed support 10 has a shoulder 46 for each leg portion 24 from one of the faces to the other, which shoulders 46 are substantially perpendicular to the flange 11 bearing the braking member 10.

Figure 2:
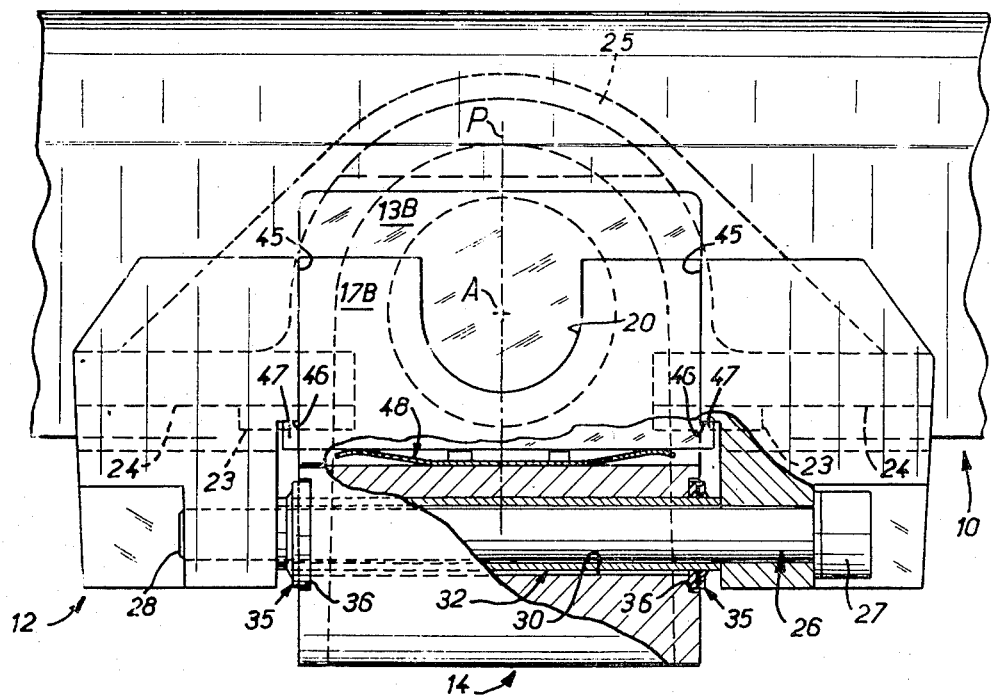
FIG. 2 is a fragmentary plan view of the brake with a cutaway portion, taken along line II—II in FIG. 1.
Figure 6:
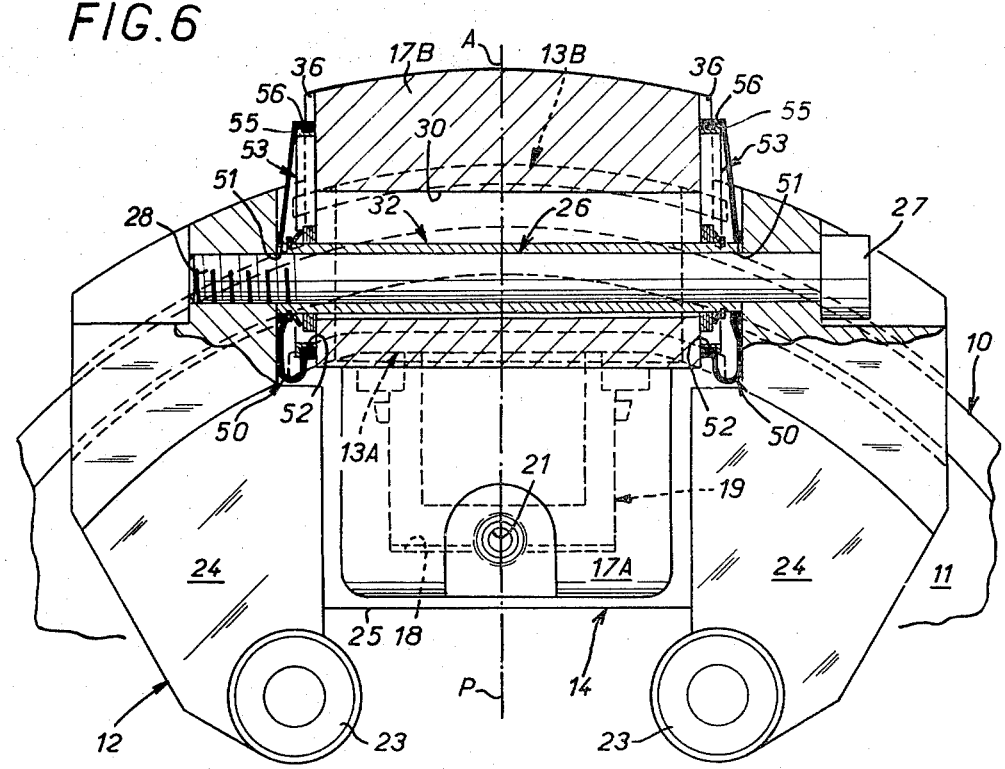
FIGS. 6 and 7 are views similar to those of FIGS. 1 and 2 relative to a modified embodiment.

The shoulders 46 serve to bear brake shoes 13A, 13B each of which comprises laterally projecting tongues 47 by which they bear against shoulders 46 urged by a common leaf spring 48 which bears at the central portion of caliper member 14 against the face thereof facing the braking member, FIGS. 2 and 3.

Thus spring 28 by itself insures the maintenance of the caliper member 14 in contact with its composite mounting assembly made up of the pin 26 and the tubular bracing member 32 forming a sleeve thereon.

The operation of such a brake is well known per se. When pressurized fluid is conveyed to the cylinder 18, piston 19 thrusts brake shoe 13A against the braking member while the caliper member 14 transmits the corresponding force to the other brake shoe 13B which is thereby also urged against the braking member, whereby the braking member 10 is therefore squeezed by the brake shoes 13A, 13B, i.e., clamped therebetween. Once the pressure of the fluid is released the braking member 10 is unclamped.

In the course of operation the caliper member 14 admits of radial displacement guided both by leg portions 24 of fixed support 12 as by the composite mounting assembly which extends therethrough; by reason of the rounded surface of the latter, it allows pivotal movement if necessary in order to adapt to possible coning of the braking member 10.

According to the modified embodiment illustrated in FIGS. 6 to 9, each of the sealing members at the ends of slot 30 in the caliper member 14 comprises expandable sealing cap 50. The sealing caps 50 are in sealing annular engagement on the tubular bracing member 32 by its central opening 51; the bracing member 32 together with pin 26 pass through slot 30 in caliper member 14. At its periphery 52 each sealing cap is in engagement with a metal frame 53 which is, in turn, force-fitted in groove 36 formed in the corresponding lateral face of caliper member 14 as above; the groove 36 is generally radially elongated and its flanks enclose the end of the slot 30. The frame 53 is shown on its own in FIG. 9.

For cooperation with its sealing cap 50 each frame 53 has outwardly projecting rim 54 and at the same time the periphery of the sealing cap 50 which is reinforced has a groove 55 adapted to be in engagement with the rim 54 on the frame. In line with groove 36 in the caliper member 14 the periphery 52 of the sealing cap 50 has in diametrically opposed positions axially protruding extensions 56 which extend into the groove 36. The periphery 52 of the sealing cap 50 between the rim 54 of the frame 53 and the caliper member 14 is thus under compression which is precisely what is sought. In the course of radial displacements of the caliper member 14 each sealing cap correspondly elastically deforms radially.

In the embodiment of FIGS. 6 to 9, resilient means are, in addition, provided for acting laterally against the caliper member 14. Preferably, as shown, the resilient means comprise a Belleville type washer 57 against each of the lateral faces of the caliper member 14. The spring washer 57 is in engagement on the tubular bracing member 32 and is interposed between a split ring 58 fitted in a channel 59 on the tubular bracing member and a bearing washer 60 engaged against the tubular bracing member 32 in contact with caliper member 14, in the corresponding groove 36 therein. Thus the resilient means formed by the spring washer 57 are established annularly around bracing member 32 sheltered by the associated sealing cap 50.

The resilient means serve to absorb any possible play of the caliper member 14 perpendicular to the axial plane P of symmetry and therefore prevent it from making any noise.

Figure 7:
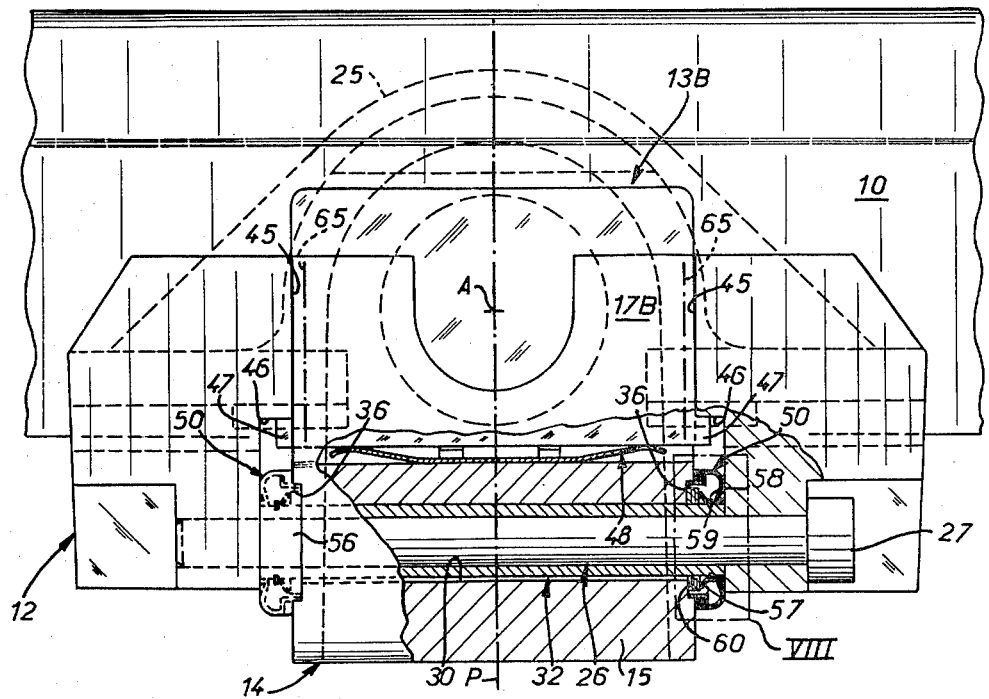

As shown in dash-dotted lines in FIG. 7, the resilient means themselves may also serve to maintain the caliper member perpendicular to the axial gripping plane P, the lateral faces 65 of the caliper member then extending spaced from the corresponding lateral faces 45 of the leg portions of the fixed support 12. In this event the caliper member 14 is free of any direct positive guiding contact relative to the fixed support 12.

Of course the present invention is not intended to be limited to the embodiments herein described and illustrated but encompasses all modifications, alternatives and expedients and combinations thereof within the scope of the appended claims.

In particular, the resilient means employed in the alternative embodiment of FIGS. 6 to 9 for acting laterally against the caliper member 14 may also be employed in the embodiment of FIGS. 1 to 5 in which case the resilient means then acts against the sealing pad 35 thereof.

What claimed is:

1. A brake of the type including a fixed support having a pair of spaced leg portions, an annular, substantially cylindrical rotary braking member, brake shoes disposed respectively inside and outside said braking member, a generally C-shaped caliper member radially straddling said brake shoes and said braking member, control means for urging both said brake shoes against said braking member; the improvement comprising a composite mounting assembly for pivotally and slidably mounting said caliper member on said fixed support including a pin member which extends between said leg portions and through a radially elongated oblong passageway in said caliper member, a tubular bracing member telescoped over and sheathing said pin member, said pin member being firmly connected to said leg portions with each end of said tubular bracing member bearing against the corresponding leg portion of said fixed support.

2. The brake according to claim 1, wherein said pin member is a tension means tying said leg portions together while the tubular bracing member is a compression means bracing said leg portions; said pin member, said bracing member and said leg portions forming a rigid unit.

3. The brake according to claim 2, further comprising sealing means provided at each end of said passageway through said caliper member.

4. The brake according to claim 3, wherein each said sealing means comprises an expandable sealing member having a central aperture by which it is annularly sealingly engaged with said tubular bracing member.

5. The brake according to claim 4, wherein the periphery of each said expandable sealing member is received on a rigid frame which is force-fitted in a generally radially elongated groove in said caliper member on its corresponding lateral face, the flanks of said rigid frame bounding the corresponding end of said passageway in said caliper member.

6. The brake according to claim 4, further comprising resilient means laterally urging said caliper member disposed annularly about said tubular bracing member and wherein said resilient means are housed inside a corresponding one of said sealing member.

7. The brake according to claim 3, wherein said sealing means comprise sealing pads annularly sealingly in engagement on said tubular bracing member.

8. The brake according to claim 7, wherein each said sealing pad is in slidable engagement in a groove formed in the corresponding lateral face of said caliper member, the groove being generally radially elongated, like said passageway.

9. The brake according to claim 4, wherein each said sealing pad comprises a rigid platelike web having a circular aperture in its central region and covered on at least one side with a coating of deformable material forming a flexible lip around the aperture in the web.

10. The brake according to claim 9, further comprising spaced radial projections or teeth along the contour of the aperture in the web.

11. The brake according to claim 7, wherein said coating covers both sides of the web.

12. The brake according to claim 11, wherein the coating also covers the peripheral edges of the web.

13. The brake according to claim 1, further comprising resilient means laterally urging said caliper member disposed annularly about said tubular bracing member.

14. The brake according to claim 13, wherein said caliper member is free from all positive, direct contact with said fixed support, the lateral faces of said caliper member being spaced from the corresponding faces of said leg portions of said fixed support.

15. The brake according to claim 13, wherein said resilient means are interposed between a split ring received in a channel in said tubular bracing member, and a bearing washer in engagement on said tubular bracing member in contact with said caliper member.

16. The brake according to claims 13 or 15, wherein said resilient means comprises at least one Belleville type washer.

* * * * *